July 24, 1934.  L. D. SOUBIER  1,967,377
SUCTION TYPE GLASS GATHERING AND FORMING MACHINE
Filed Oct. 3, 1931  3 Sheets-Sheet 3
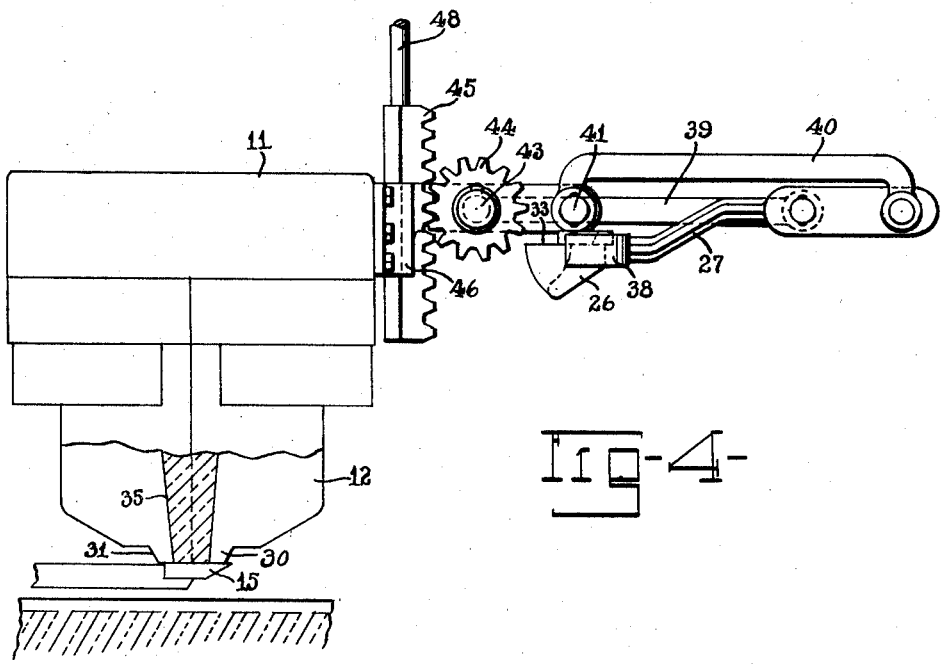
Fig-4-
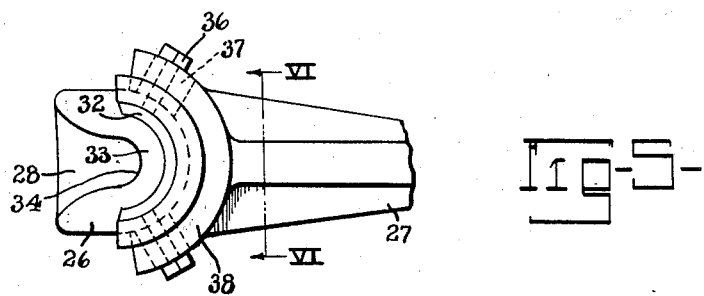
Fig-5-
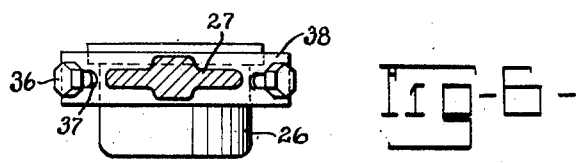
Fig-6-
Inventor
Leonard D. Soubier
By J. F. Rule,
Attorney Patented July 24, 1934

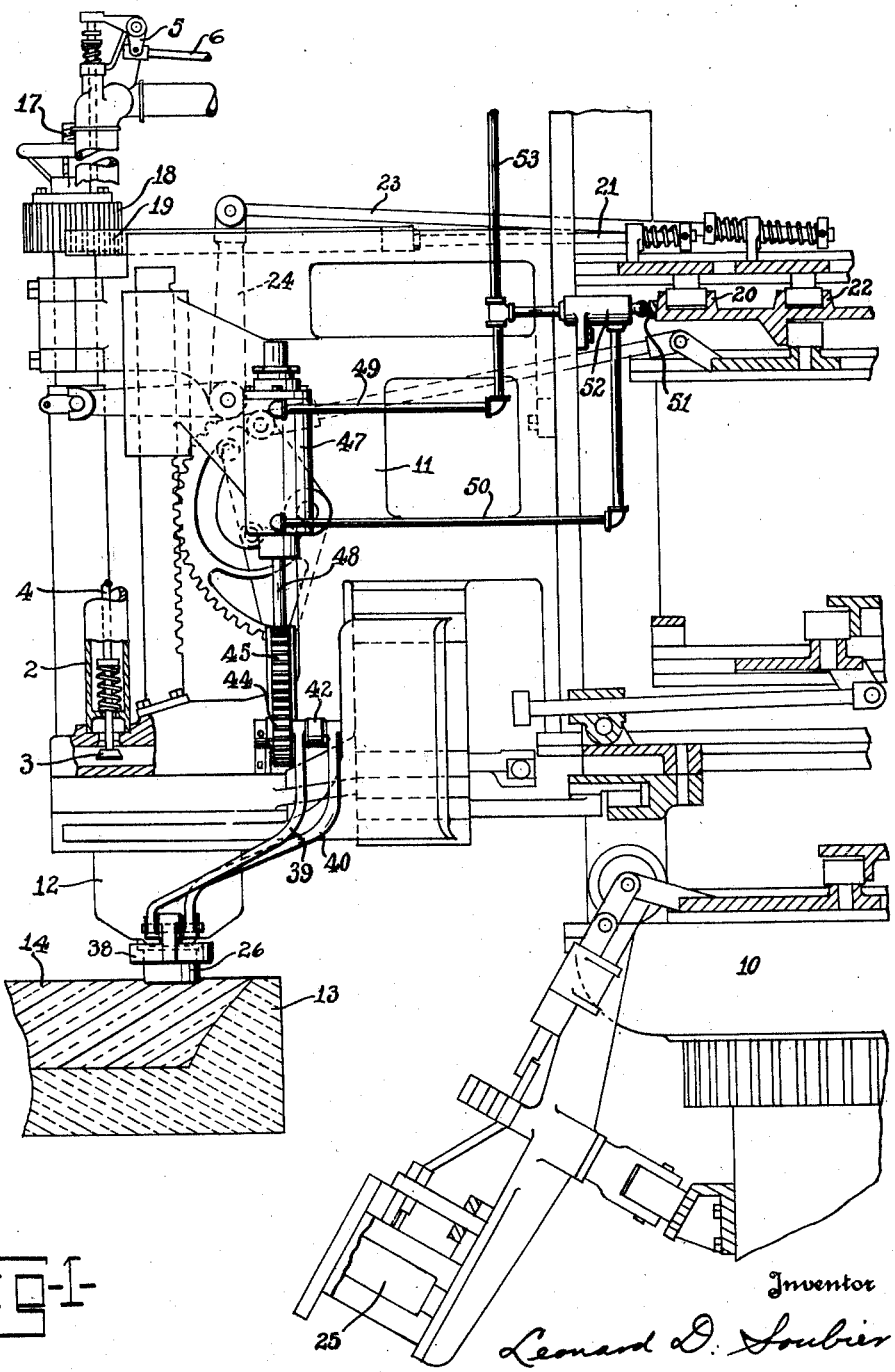

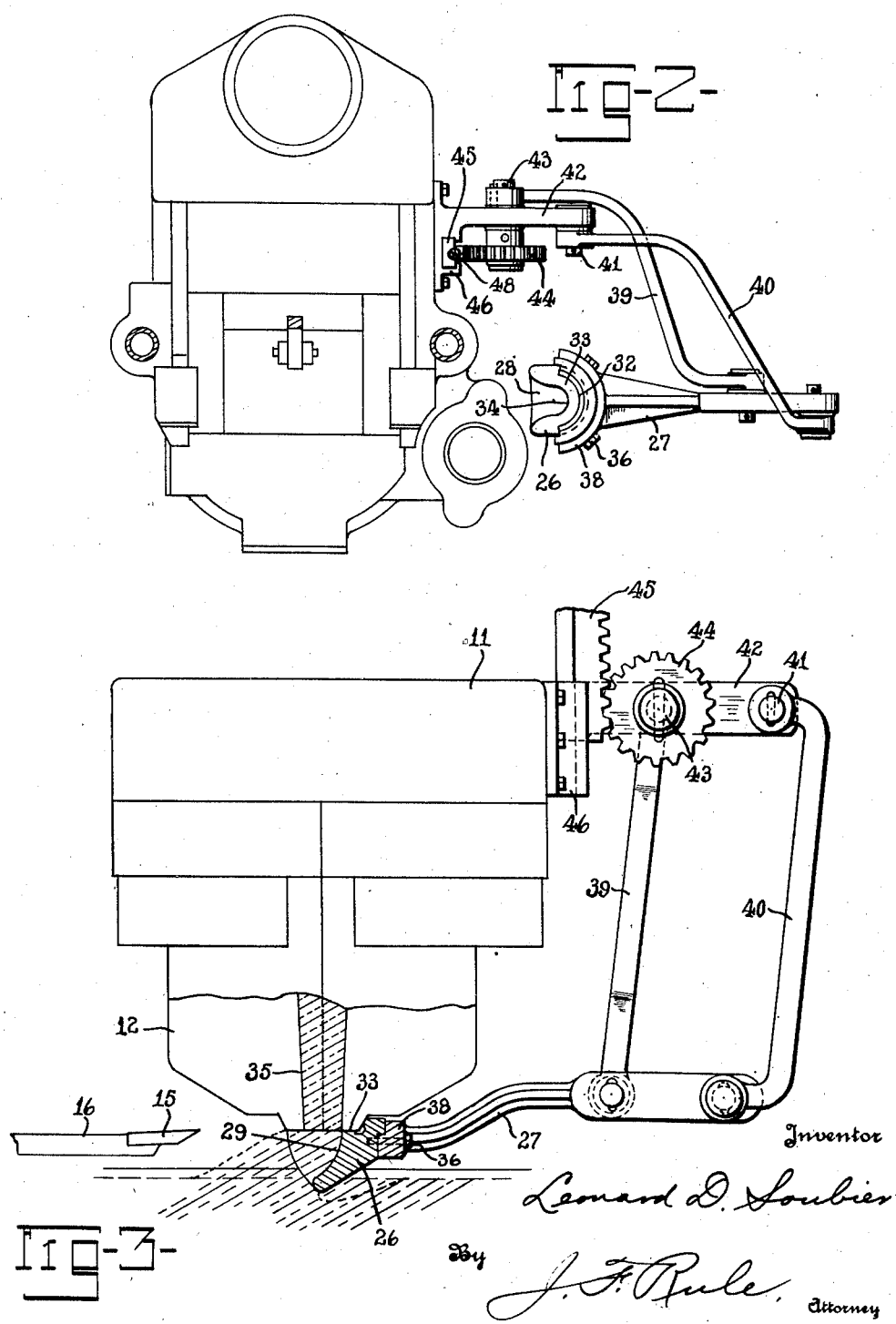

1,967,377

UNITED STATES PATENT OFFICE 1,967,377

SUCTION TYPE GLASS GATHERING AND FORMING MACHINE

Leonard D. Soubier, Woonsocket, R. I., assignor to Owens-Illinois Glass Company, a corporation of Ohio Application October 3, 1931, Serial No. 566,645

19 Claims. (Cl. 49—5)

My invention relates to machines for forming glass articles, and is particularly adapted to the type of machines in which traveling molds are periodically brought into operative relation to a pool of molten glass and charges of glass introduced by suction into the molds. In machines of this type, the gathering molds usually travel in a horizontal direction and are periodically brought over the pool or supply body of glass, then moved downward so that their lower open ends dip into and plow through the glass while they are being charged by suction.

An object of the present invention is to provide a novel mechanism by which a portion of the glass in the supply body may be raised into sealing contact with the traveling mold, permitting the latter to be charged by suction without dipping into the supply body or plowing therethrough. The invention is of particular value when used with Owens type suction machines or other machines in which suction molds during the gathering operation are traveling at comparatively high speeds, as the invention is conducive to smooth operation at high speeds.

A further object of the invention is to provide means by which excessive local heating of the lower end of the mold is avoided, such heating being greatly reduced as compared with that caused by the mold plowing through the glass. This results in greatly reduced wear on the molds as compared with that due to the usual high temperatures to which the lower ends of the molds are raised when plowing through the pool of glass. A more nearly uniform temperature throughout the mold is also obtained, which is desirable because it prevents undue warpage or distortion of the mold and also results in a more nearly uniform temperature of the parison in the mold throughout its length, which is an important element in the production of ware of high quality.

A further feature is the reduction or elimination of the chilling action on the glass in the supply body which takes place with the usual method of operation in which the mold dips into and plows through the glass.

A further object of the invention is to provide effective means for producing a plowing action in the supply body of glass, skimming the surface adjacent the gathering area and maintaining a circulation of the glass, particularly in a combination and arrangement of parts in which the gathering mold itself does not dip below the level of the supply body.

A further feature of the invention is the provision of improved means whereby while the mold is traveling horizontally relative to the pool of glass and above the level of the pool, a localized body of glass from which the mold charge is being drawn is caused to advance with the mold so that said body and mold are relatively stationary.

A further object of the invention attained by causing a charge of glass to be drawn from a relatively stationary supply in the manner noted, is the production of a compact parison of glass in the mold owing to the elimination of adverse exterior forces incident to gathering glass in the usual manner while the mold is plowing through the pool.

Other objects of the invention will appear hereinafter.

In the accompanying drawings:

Fig. 1 is a sectional elevation showing one head or unit of an Owens suction type machine embodying the present invention.

Fig. 2 is a sectional plan view of said unit, showing the glass gathering and lifting device in its retracted position.

Fg. 3 is a part sectional front elevation of the same, with the said lifting device lowered to its operating position.

Fig. 4 is a view similar to Fig. 3, but with the lifting device retracted.

Fig. 5 is a plan view showing the glass lifting device.

Fig. 6 is a sectional elevation of the same at the line VI—VI on Fig. 5.

In my copending application Serial Number 672,816, Filed May 25, 1933, Apparatus for gathering molten glass, I have disclosed and claimed subject-matter disclosed in the present application, relating particularly to a mold plow adjustable laterally with respect to the mold or circumferentially of the mold.

Referring to the drawings, the invention is shown as applied to an Owens type suction gathering machine of standard construction. The machine comprises a mold carriage 10 rotatable continuously about a vertical axis and on which are mounted an annular series of mold carrying heads or units 11. Each head carries a split blank mold 12 which, as it travels with the mold carriage, is periodically brought over a gathering tank 13 containing a supply body or pool of molten glass 14. Said tank may be either an extension of the usual furnace tank, or may be a rotating tank to which the glass is supplied from the main furnace.

When the blank mold reaches a position over the tank, sealing contact of the mold with the glass in the tank is effected in the manner hereinafter described. The air is then exhausted from the blank mold cavity by opening a valve 3 in a vacuum pipe line 2 so that a charge of glass is drawn by suction into the mold. The valve is opened by the usual mechanism including a rod 4, bell crank 5 and rod 6 having operating connections with a stationary cam (not shown).

After the mold receives its charge, a knife 15 carried on a rock arm 16 at the lower end of a vertical rock shaft 17, is operated by the usual mechanism standard to Owens suction type machines. Such mechanism includes a pinion 18 driven by a rack 19, said rack being actuated by a stationary cam 20 through operating connections 21. The knife is lifted and lowered by means of a stationary cam 22 operating through connections including a link 23 and a bell crank 24. A finishing mold 25 cooperates with the blank mold to receive the parison formed therein.

The machine as thus far described is of standard construction, except that as shown it does not include means for lifting and lowering the blank mold, such means being unnecessary when the present invention is employed. It will be understood, however, that means for lifting and lowering the blank mold may be used, if desired, in connection with the glass lifting device herein disclosed.

Such device and its actuating mechanism will now be described. The device or implement is in the nature of a plow or scoop 26 mounted on an arm 27. The implement faces in the direction of its travel with the mold and is formed with a forwardly opening cup-like recess 28. The rear wall 29 (Fig. 3) of said recess is forwardly and downwardly curved so that when the implement is in operative relation to the mold and plowing through the glass, as shown in Fig. 3, the glass piles up in front of the implement and is thereby brought into sealing contact with the lower end of the mold 12.

The blank mold is formed on its lower end with an extension 30 providing a tapered annular shoulder 31. The implement 26 is formed with an inclined surface 32 shaped to correspond with and engage the mold shoulder 31, the surface 32 extending circumferentially of said shoulder 31 for approximately half of its circumference. The implement is also provided with an upper horizontal face 33 to fit against the bottom of the mold. The implement is thus designed to fit snugly against the mold and to be firmly held in such position during the gathering of a charge of glass into the mold. The upper edge 34 of the implement, where the surfaces 29 and 33 meet, is curved to conform to the circumference of the circle which forms the bottom opening of the mold cavity 35 so that said edge coincides with the bottom edge of the mold cavity through substantially half said circumference. The surface 29 thus merges into or forms a continuation of the walls of the mold cavity so that the glass is guided smoothly into the mold.

The implement or head 26 is removably attached to the arm 27 by means of screw bolts 36 which extend through elongated slots 37 in an arc-shaped shank 38 formed on the arm 27. The bolts 36 are screw threaded into the head 26. The engaging surfaces of the head 26 and shank 38 are arc-shaped and concentric with the edge 34 and with the mold cavity 35. This construction permits the head 26 to be readily removed or replaced by another head, and also permits rotative adjustment of said head.

The head 26 is positioned behind the mold and is adapted to be swung rearwardly and upwardly to the inoperative position shown in Figs. 2 and 4. The mechanism for supporting the head 26 includes a pair of arms or links 39 and 40 pivotally connected at their lower ends to the arm 27. The upper end of the arm 40 is connected by a pivot 41 to a horizontal bracket arm 42 attached to the dip head 11. The upper end of the arm 39 is keyed to a stub shaft 43 journaled in the bracket arm 42. A gear wheel 44 is keyed to the shaft 43 and is actuated by a rack bar 45, movable up and down in a guideway 46 formed in the bracket arm 42.

The rack 45 is reciprocated by an air motor 47 having a piston 48 connected to the rack bar. Air under pressure is supplied to the upper and lower ends of the motor cylinder, respectively, through pipes 49 and 50. The motor may be of the usual differential pressure type, air under pressure being constantly supplied above the piston through the pipe 49 and intermittently supplied through the pipe 50 to the cylinder below the piston. This intermittent pressure is controlled by a stationary cam 51 operating a valve 52 for opening and closing the pipe 50 to the air pressure pipe 53.

When the air motor 47 moves the rack 45 downward, the pinion 44 (Fig. 3) is rotated and thereby swings the arm 39 in a counter-clockwise direction upward to a horizontally disposed position (Figs. 2 and 4.) This movement is transmitted to the arms 27 and 40 so that the arm 40 is also swung upward to a susbtantially horizontal position and at the same time the arm 27 with the gathering head 26 is swung upwardly and rearwardly, said arm 27 retaining a substantially horizontal position owing to its parallel link connection through the links or arms 39, 40 to the bracket arm 42. This upward movement of the head 26 permits it to clear the walls of the tank 13 and also positions it where it will not interfere with the movements of the finishing mold or other parts of the machine.

The operation is as follows:

During the continuous rotation of the mold carriage, each black mold 12 travels continuously in a horizontal circular path and is thereby brought periodically to a charge gathering position over the tank 13, the lower open end of the mold being a short distance above the top level of the tank. As the mold approaches the gathering position, the valve 52 (Fig. 1) is actuated by the cam 51 to supply air through the pipe 50 to the air motor 47, operating the latter to lift the rack 45, thereby swinging the gathering head 26 downward to operative position (Fig. 3). In this position, said head dips into the glass so that as it advances with the mold it plows through the glass and scoops a quantity of the glass upward into engagement with the bottom face of the mold. A sealing contact is thus provided between the glass and the mold. The air is now exhausted from the mold cavity in the usual manner, so that glass is drawn upwardly from the pool and fills the mold cavity. The valve 52 is now actuated to cut off the air pressure through the pipe 50 and open it to exhaust so that the air motor 47 moves the rack bar 45 downward, thereby returning the gathering head 26 to its elevated position. About the time the gathering head commences its retractive movement, the knife 15 is advanced across the bottom of the mold to sever the glass and close the mold cavity, as shown in Fig. 4, this being the usual knife operation. The severing operation preferably takes place immediately after the gathering head 26 is withdrawn and before the suction in the mold cavity is discontinued.

It should be noted that the gathering head 26, as it moves through the glass, operates as a skimmer to remove chilled surface portions of the glass and further operates as a stirring implement to assist in maintaining a circulating movement of the glass past the gathering area.

Modification may be resorted to within the spirit and scope of my invention.

What I claim is:

1. The combination of a container for a pool of molten glass, a receptacle having an opening for the entrance of glass, means to cause said receptacle to travel over the pool of glass with said opening presented downward and spaced above the level of the glass in the pool, and a mechanical device traveling with the receptacle and extending downward into the pool of glass, said device shaped to cause an upward movement of an exposed portion of glass from the pool to the receptacle.

2. The combination of a container for a pool of molten glass, a receptacle having an opening for the entrance of glass, means to cause said receptacle to travel horizontally over the pool of glass with said opening spaced above the surface level of the pool, and a scoop traveling with said receptacle and dipping into the glass during said travel, said scoop having its face inclined downwardly and forwardly with respect to its direction of travel and positioned and arranged to cause an upward movement of glass to said opening.

3. The combination of a container for a pool of molten glass, a receptacle having an opening for the entrance of glass, means to cause said receptacle to travel over the pool of glass with said opening presented downward and spaced above the level of the glass in the pool, and a scoop positioned behind said receptacle and connected to travel therewith, said scoop extending downward into the glass in the pool and presenting an inclined surface to the glass arranged to force the glass upwardly from the pool to said opening.

4. The combination with a container for a pool of molten glass, of a mold carriage, a mold thereon open at its lower end to receive a charge of glass, means for rotating the mold carriage and causing the mold to travel horizontally over the pool of glass with said end of the mold above the level of the glass in the pool, and means traveling with the mold and projecting into the pool of glass and operative by its pressure on the glass to force glass upwardly from the level of the pool into contact with the mold.

5. The combination with a container for a pool of molten glass, of a mold carriage, a mold thereon open at its lower end to receive a charge of glass, means for rotating the mold carriage and causing the mold to travel horizontally over the pool of glass with said end of the mold above the level of the glass in the pool, means traveling with the mold and projecting into the pool of glass and operative by its pressure on the glass to force glass upwardly from the level of the pool into contact with the mold, and means for exhausting the air from the mold cavity and thereby causing a charge of glass to move upwardly into the mold.

6. The combination with a container for a pool of molten glass, of a mold carriage, a mold thereon having a horizontally disposed bottom with a mold cavity opening therethrough, means for driving the mold carriage and causing the mold to travel horizontally over the pool with the bottom face of the mold exposed and spaced above the glass in the pool, and means for causing an upward movement of an exposed portion of glass from the pool into the mold, said means comprising a scoop positioned behind the mold cavity and extending from the lower face of the mold downward into said pool, said scoop mounted to travel with the mold.

7. The combination with a container for a pool of molten glass, of a mold carriage, a mold thereon having a horizontally disposed bottom with a mold cavity opening therethrough, means for driving the mold carriage and causing the mold to travel horizontally over the pool with the bottom face of the mold exposed and spaced above the glass in the pool, and means for causing an upward movement of an exposed portion of glass from the pool into the mold, said means comprising a scoop positioned behind the mold cavity and formed with a glass guiding surface extending downwardly and forwardly from the bottom face of the mold with its lower end dipping beneath the surface of the pool.

8. In a machine for forming glass articles, the combination of a mold formed with a cavity opening through the bottom face of the mold, a device for guiding glass upwardly to the mold cavity, said device formed with a trough-shaped guiding surface extending downwardly and forwardly beneath the mold cavity, the walls of said guiding surface being downwardly and outwardly flared and automatic means for periodically moving said device to and from an operative position beneath the mold.

9. The combination of a traveling mold carriage, a mold mounted thereon, said mold having a cavity therein opening downwardly through the bottom of the mold, a scoop beneath the mold and in register with the mold cavity, said scoop shaped and arranged to guide glass upwardly from a pool of glass into the mold cavity, said scoop mounted on the mold carriage, and automatic means for periodically positioning said scoop alternately in an operative position beneath the mold and an inoperative position at one side of the mold.

10. The combination with a suction gathering mold having a horizontally disposed bottom face and a vertically disposed mold cavity opening therethrough, of a scoop positioned below the mold and behind the mold cavity, said scoop having an exposed surface extending downward and forward from the rear wall of the mold cavity, and automatic means for periodically withdrawing the scoop rearwardly and upwardly from said position.

11. The combination with a suction gathering mold having a horizontally disposed bottom face and a vertically disposed mold cavity opening therethrough, of a scoop positioned below the mold and behind the mold cavity, said scoop having an exposed surface extending downward and forward from the rear wall of the mold cavity, the upper edge of said surface being in register with said rear wall and shaped to conform to the shape of said wall and automatic means for periodically withdrawing said device rearwardly and upwardly from its operative position.

12. The combination with a suction gathering mold having a horizontally disposed bottom face and a vertically disposed mold cavity opening therethrough, a device for guiding glass into the mold, said device having a horizontal surface to seat against the bottom surface of the mold, and a glass guiding exposed surface extending downwardly and forwardly from the rear wall of the mold cavity.

13. The combination with a suction gathering mold having a horizontally disposed bottom face and a vertically disposed mold cavity opening therethrough, a device for guiding glass into the mold, said device having a horizontal surface to seat against the bottom surface of the mold, a glass guiding exposed surface extending downwardly and forwardly from the rear wall of the mold cavity, the mold and said device being formed with engaging shoulders behind the mold cavity for limiting the movement of said device, and automatic means for periodically moving said device into and out of its operative position beneath the mold.

14. In a machine for forming glass articles, the combination of a suction gathering mold having a mold cavity opening through the bottom end thereof, a device for guiding glass upwardly to said opening, parallel links mounted on the mold carriage and supporting said device, and automatic means for actuating said links to swing said device rearwardly and upwardly away from the mold.

15. The combination with a tank to contain a pool of molten glass, of a mold, mechanism for causing said mold to travel horizontally over the tank, said mold having an exposed bottom end with the mold cavity open at said end, and means operating during the horizontal travel of the mold for causing an upward movement of a localized mass of the glass while integral with the main body of glass in the pool, into sealing contact with said exposed bottom end of the mold at a plane above the level of the surrounding glass in the pool, and a forward movement of the localized mass with the traveling mold, said means being operable to effect said movements of the glass by a force applied to the glass independently of the mold cavity.

16. The combination of a container for a pool of molten glass, a receptacle having an opening for the entrance of glass, means for causing said receptacle to travel over the pool of glass with said opening presented downward and spaced above the level of the glass in the pool with an unconfined space between said opening and the pool, means for causing an upward movement of an exposed mass of glass from the pool through said unconfined space into contact with said receptacle during its said travel and causing said mass to advance with the traveling mold, and means to cause the advancing glass to enter the mold.

17. The combination of a container for a pool of molten glass, a receptacle having an opening for the entrance of glass, means for causing said receptacle to travel over the pool of glass with said opening presented downward and spaced above the level of the glass in the pool with an unconfined space between said opening and the pool, means for causing an upward movement of an exposed mass of glass from the pool through said unconfined space into sealing contact with the receptacle during its travel and causing said mass to advance with the traveling mold, and means for exhausting the air from said receptacle and drawing glass from said advancing mass into the said receptacle.

18. The combination with a tank to contain a pool of molten glass, of a mold, means for causing said mold to travel horizontally over the tank, said mold having an exposed bottom end with the mold cavity open at said end and an unconfined space between said bottom end and the pool of glass, means for causing an upward movement of a mass of glass while integral with the body of glass in the pool, through said unconfined space into sealing contact with said bottom end of the mold at a plane above the level of the pool, and means for causing the mass while integral with the said body of glass in the pool, to advance horizontally with the traveling mold.

19. The combination with a container for a pool of molten glass, of a mold carriage, a mold thereon having a horizontally disposed bottom with a mold cavity opening therethrough, means for driving the mold carriage and causing the mold to travel horizontally over the pool with the bottom face of the mold exposed and spaced above the glass in the pool with an unobstructed space between said bottom face and the glass in the pool, and means for causing an exposed portion of glass to move upward through said space from the pool into the mold during the travel of the mold, and to advance laterally with the mold while moving upward from the pool to the mold.

LEONARD D. SOUBIER.